United States Patent
Kutz et al.

(10) Patent No.: US 12,199,663 B2
(45) Date of Patent: Jan. 14, 2025

(54) ADAPTIVE EXTENDED REALITY TRANSMISSIONS FOR ULTRA-WIDE BAND COMMUNICATIONS

(71) Applicant: QUALCOMM Incorporated, San Diego, CA (US)

(72) Inventors: Gideon Shlomo Kutz, Ramat Hasharon (IL); Amit Bar-Or Tillinger, Tel-Aviv (IL); David Yunusov, Holon (IL)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 18/158,187

(22) Filed: Jan. 23, 2023

(65) Prior Publication Data

US 2024/0250714 A1    Jul. 25, 2024

(51) Int. Cl.
*H04B 1/71* (2011.01)
*H04B 1/7176* (2011.01)
*H04L 67/131* (2022.01)

(52) U.S. Cl.
CPC ......... *H04B 1/7176* (2013.01); *H04L 67/131* (2022.05)

(58) Field of Classification Search
CPC .......................... H04B 1/7176; H04L 67/131
See application file for complete search history.

(56) References Cited

U.S. PATENT DOCUMENTS

| | | | |
|---|---|---|---|
| 9,215,695 B2 | 12/2015 | Suzuki et al. | |
| 11,963,051 B2* | 4/2024 | Umapathy | H04W 36/00837 |
| 2003/0185181 A1 | 10/2003 | Balachandran et al. | |
| 2021/0359795 A1 | 11/2021 | Elshafie et al. | |
| 2022/0124852 A1* | 4/2022 | Kim | H04W 74/00 |
| 2024/0137893 A1* | 4/2024 | Hunukumbure | H04W 64/00 |

OTHER PUBLICATIONS

Avudainayagam A., et al., "A Hyper-Trellis Based Turbo Decoder for Wyner-Ziv Video Coding", Globecom '05, IEEE Global Telecommunications Conference, 2005, IEEE, St. Loius, MO, USA, Nov. 28, 2005-Dec. 2, 2005, Piscataway, NJ, USA, vol. 3, Nov. 28, 2005, pp. 1412-1417, XP010880867, p. 5.
International Search Report and Written Opinion—PCT/US2023/086144—ISA/EPO—Apr. 10, 2024.

* cited by examiner

*Primary Examiner* — Dac V Ha
(74) *Attorney, Agent, or Firm* — Harrity & Harrity, LLP

(57) ABSTRACT

Ultra-wide band frequencies used for extended reality (XR) services operate as unlicensed spectrum, which can result in unexpected interference. Although some link adaptation procedures can be used, uncertain link quality can result in sub-optimal utilization of spectrum resources, which may result in poor performance of an XR service. Some aspects described herein enable use of a fixed quantity of re-transmissions of data for an XR frame, with each of the re-transmissions having different XR frame qualities or different quantities of parity bits. The XR device may transmit a feedback message indicating whether the first transmission was successful and may receive a second transmission with additional data for the XR frame. In this way, the XR device can ensure a more efficient use of network resources.

30 Claims, 13 Drawing Sheets

ADAPTIVE EXTENDED REALITY TRANSMISSIONS FOR ULTRA-WIDE BAND COMMUNICATIONS

FIELD OF THE DISCLOSURE

Aspects of the present disclosure generally relate to wireless communication and to techniques and apparatuses for adaptive extended reality (XR) transmissions for ultra-wide band communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. 5G, which may be referred to as New Radio (NR), is a set of enhancements to the LTE mobile standard promulgated by the 3GPP. 5G is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in 4G, 5G, and other radio access technologies remain useful.

SUMMARY

An extended reality (XR) device may communicate with a network node and/or a user equipment (UE) to obtain data, which may include XR data, frame data, or another type of data, associated with providing an XR functionality. The XR device may communicate with a UE on a sidelink to obtain data, which may reduce a power consumption of the XR device relative to communicating with a network node on an access link. When communicating on a sidelink, the XR device and the UE may use ultra-wide band frequencies, such as frequencies in a range of approximately 6 Gigahertz (GHz) to 10 GHz. These ultra-wide band frequencies may correspond to a portion of a frequency range designated FR3, as described in more detail below. Ultra-wide band frequencies may enable use of relatively large bandwidths, such as bandwidths of up to approximately 3 GHz, which may facilitate data transfer of large amounts of data associated with providing XR service.

However, these ultra-wide band frequencies operate as unlicensed spectrum, which can result in unexpected interference. Although some link adaptation procedures can be used, uncertain link quality can result in sub-optimal utilization of spectrum resources, which may result in poor performance of an XR service. Some aspects described herein enable use of a fixed quantity of re-transmissions of data for an XR frame, with each of the re-transmissions having different XR frame qualities or different quantities of parity bits. For example, an XR device may receive (e.g., from a UE) a first transmission that includes first data for an XR frame with a first frame quality (e.g., a first resolution) and a first quantity of parity bits. The XR device may transmit a feedback message indicating whether the first transmission was successful and may receive a second transmission with additional data for the XR frame. In this case, when the feedback message indicates successful receipt of the first transmission, the additional data can be used for a second frame quality (e.g., a second resolution) that is better than the first frame quality. In contrast, when the feedback message indicates a failure of the first transmission, the additional data can be used for a second quantity of parity bits. Collectively, the first transmission and the second transmission have a greater quantity of parity bits than the first transmission alone, thereby improving reliability. In this way, the XR device, a UE, and/or a network node can ensure a more efficient use of network resources and achievement of a higher resolution for XR services without introducing an unpredictable delay in data transfer for the XR services.

Some aspects described herein relate to a method of wireless communication performed by an XR device. The method may include receiving, via an ultra-wide band connection, a first transmission conveying first data for a frame, the first data being associated with a first XR frame quality and a first quantity of parity bits. The method may include transmitting a feedback message based at least in part on receiving the first transmission. The method may include receiving, via the ultra-wide band connection and based at least in part on transmitting the feedback message, a second message conveying second data for the frame, the second data being associated with a second XR frame quality and a second quantity of parity bits.

Some aspects described herein relate to a method of wireless communication performed by a UE. The method may include transmitting, via an ultra-wide band connection, a first message conveying first data for a frame, the first data being associated with a first XR frame quality and a first quantity of parity bits. The method may include receiving a feedback message based at least in part on transmitting the first message. The method may include transmitting, via the ultra-wide band connection and based at least in part on receiving the feedback message, a second transmission conveying second data for the frame, the second data being associated with a second XR frame quality and a second quantity of parity bits.

Some aspects described herein relate to an XR device for wireless communication. The XR device may include a memory and one or more processors coupled to the memory. The one or more processors may be configured to receive, via an ultra-wide band connection, a first transmission conveying first data for a frame, the first data being associated with a first XR frame quality and a first quantity of parity bits. The one or more processors may be configured to transmit a feedback message based at least in part on receiving the first transmission. The one or more processors may be configured to receive, via the ultra-wide band connection and based at least in part on transmitting the feedback message, a second message conveying second data for the frame, the second data being associated with a second XR frame quality and a second quantity of parity bits.

Some aspects described herein relate to a UE for wireless communication. The user equipment may include a memory and one or more processors coupled to the memory. The one or more processors may be configured to transmit, via an ultra-wide band connection, a first message conveying first data for a frame, the first data being associated with a first XR frame quality and a first quantity of parity bits. The one or more processors may be configured to receive a feedback message based at least in part on transmitting the first message. The one or more processors may be configured to transmit, via the ultra-wide band connection and based at least in part on receiving the feedback message, a second transmission conveying second data for the frame, the second data being associated with a second XR frame quality and a second quantity of parity bits.

Some aspects described herein relate to a non-transitory computer-readable medium that stores a set of instructions for wireless communication by XR device. The set of instructions, when executed by one or more processors of an XR device, may cause the XR device to receive, via an ultra-wide band connection, a first transmission conveying first data for a frame, the first data being associated with a first XR frame quality and a first quantity of parity bits. The set of instructions, when executed by one or more processors of an XR device, may cause the XR device to transmit a feedback message based at least in part on receiving the first transmission. The set of instructions, when executed by one or more processors of an XR device, may cause the XR device to receive, via the ultra-wide band connection and based at least in part on transmitting the feedback message, a second message conveying second data for the frame, the second data being associated with a second XR frame quality and a second quantity of parity bits.

Some aspects described herein relate to a non-transitory computer-readable medium that stores a set of instructions for wireless communication by a UE. The set of instructions, when executed by one or more processors of the UE, may cause the UE to transmit, via an ultra-wide band connection, a first message conveying first data for a frame, the first data being associated with a first XR frame quality and a first quantity of parity bits. The set of instructions, when executed by one or more processors of the UE, may cause the UE to receive a feedback message based at least in part on transmitting the first message. The set of instructions, when executed by one or more processors of the UE, may cause the UE to transmit, via the ultra-wide band connection and based at least in part on receiving the feedback message, a second transmission conveying second data for the frame, the second data being associated with a second XR frame quality and a second quantity of parity bits.

Some aspects described herein relate to an apparatus for wireless communication. The apparatus may include means for receiving, via an ultra-wide band connection, a first transmission conveying first data for a frame, the first data being associated with a first XR frame quality and a first quantity of parity bits. The apparatus may include means for transmitting a feedback message based at least in part on receiving the first transmission. The apparatus may include means for receiving, via the ultra-wide band connection and based at least in part on transmitting the feedback message, a second message conveying second data for the frame, the second data being associated with a second XR frame quality and a second quantity of parity bits.

Some aspects described herein relate to an apparatus for wireless communication. The apparatus may include means for transmitting, via an ultra-wide band connection, a first message conveying first data for a frame, the first data being associated with a first XR frame quality and a first quantity of parity bits. The apparatus may include means for receiving a feedback message based at least in part on transmitting the first message. The apparatus may include means for transmitting, via the ultra-wide band connection and based at least in part on receiving the feedback message, a second transmission conveying second data for the frame, the second data being associated with a second XR frame quality and a second quantity of parity bits.

Aspects generally include a method, apparatus, system, computer program product, non-transitory computer-readable medium, user equipment, base station, wireless communication device, network entity, network node, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
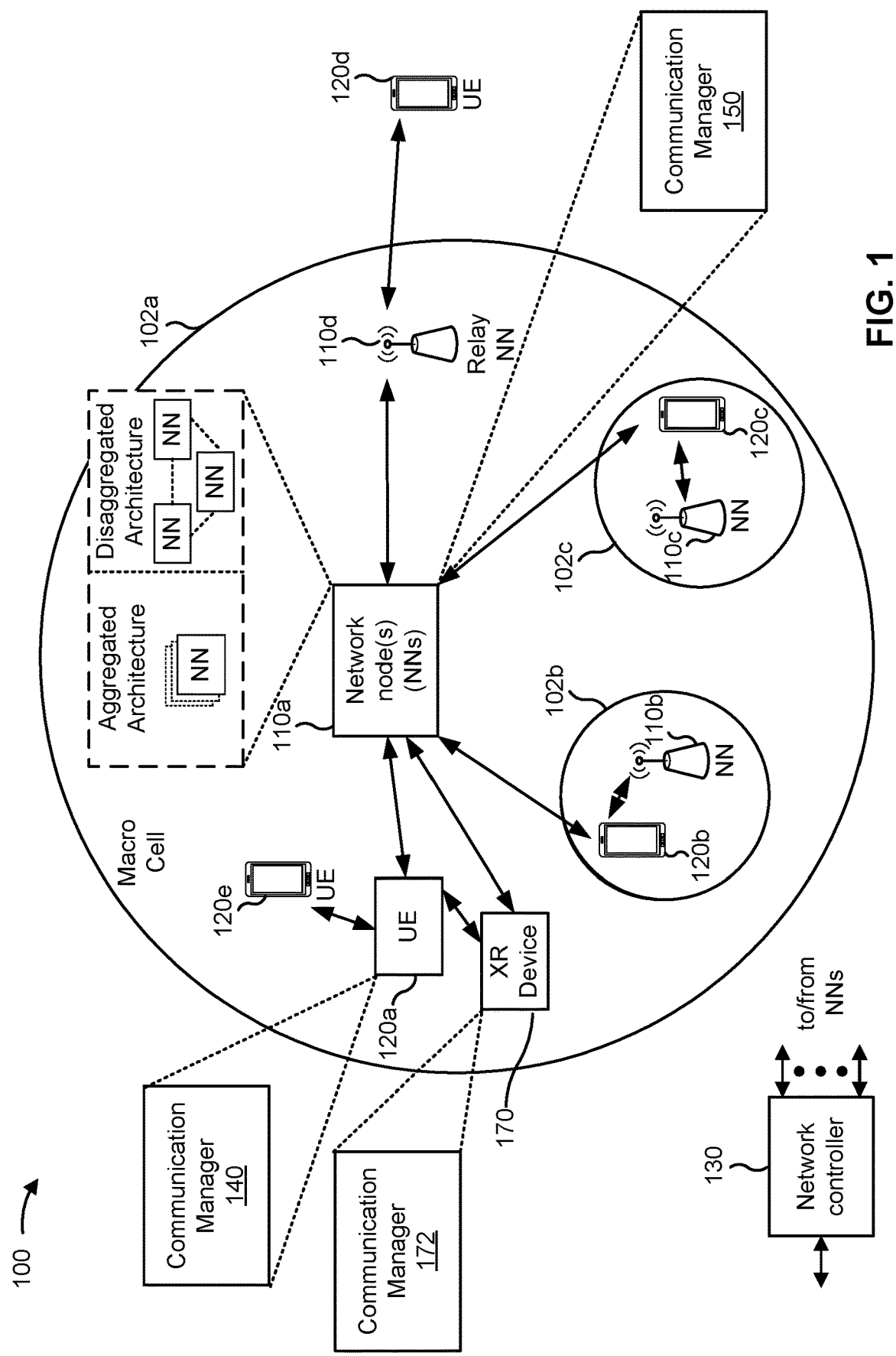
FIG. 1 is a diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In some examples, the wireless network 100 may include an extended reality (XR) device 170. For example, an XR device 170 may communicate with a network node 110 (e.g., via an access link) and/or a UE 120 (e.g., via a sidelink). In some examples, an XR device 170 may be an example of a UE 120. In other words, some UEs 120 may be XR devices 170. XR functionalities may include augmented reality (AR), virtual reality (VR), or mixed reality (MR), among other examples. For example, when providing an XR service, the XR device 170 may provide rendered data via a display, such as a screen, a set of VR goggles, a heads-up display, or another type of display.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the XR device 170 may include a communication manager 172. As described in more detail elsewhere herein, the communication manager 172 may receive, via an ultra-wide band connection, a first transmission conveying first data for a frame, the first data being associated with a first XR frame quality and a first quantity of parity bits; transmit a feedback message based at least in part on receiving the first transmission; and receive, via the ultra-wide band connection and based at least in part on transmitting the feedback message, a second message conveying second data for the frame, the second data being associated with a second XR frame quality and a second quantity of parity bits. Additionally, or alternatively, the communication manager 172 may perform one or more other operations described herein.

In some aspects, the UE 120 may include a communication manager 140. As described in more detail elsewhere herein, the communication manager 140 may transmit, via an ultra-wide band connection, a first message conveying first data for a frame, the first data being associated with a first XR frame quality and a first quantity of parity bits; receive a feedback message based at least in part on transmitting the first message; and transmit, via the ultra-wide band connection and based at least in part on receiving the feedback message, a second transmission conveying second data for the frame, the second data being associated with a second XR frame quality and a second quantity of parity bits. Additionally, or alternatively, the communication manager 140 may perform one or more other operations described herein.

In some aspects, the network node 110 may include a communication manager 150. As described in more detail elsewhere herein, the communication manager 150 may transmit, via an ultra-wide band connection, a first message conveying first data for a frame, the first data being associated with a first XR frame quality and a first quantity of parity bits; receive a feedback message based at least in part on transmitting the first message; and transmit, via the ultra-wide band connection and based at least in part on receiving the feedback message, a second message conveying second data for the frame, the second data being associated with a second XR frame quality and a second quantity of parity bits. Additionally, or alternatively, the communication manager 140 may perform one or more other operations described herein.

As indicated above, FIG. 1 is provided as an example. Other examples may differ from what is described with regard to FIG. 1.

Figure 2:
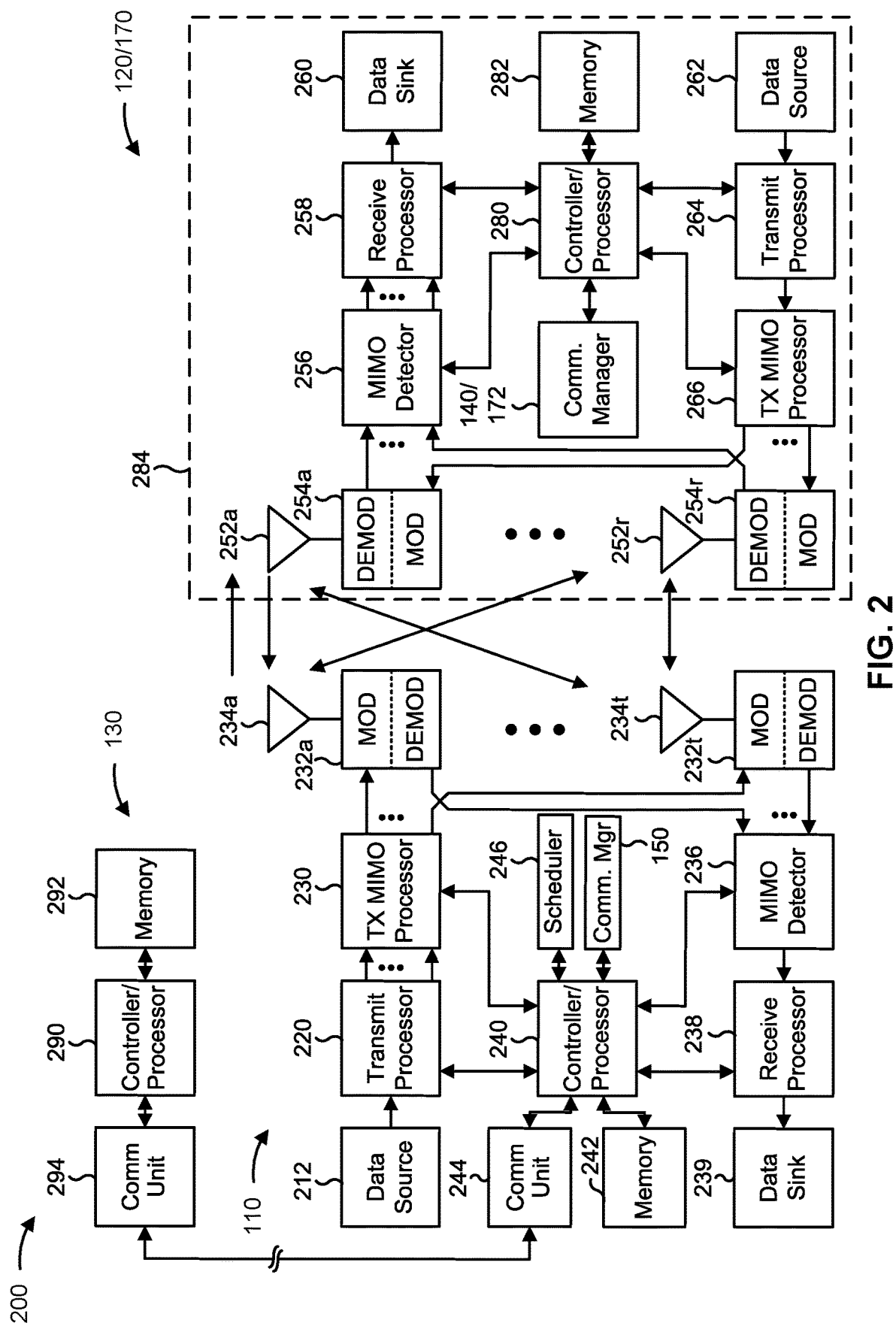
FIG. 2 is a diagram illustrating an example of a network node in communication with a user equipment (UE) or an extended reality (XR) device in a wireless network.

FIG. 2 is a diagram illustrating an example 200 of a network node 110 in communication with a UE 120 or the XR device 170 in a wireless network 100. The network node 110 may be equipped with a set of antennas 234a through 234t, such as T antennas (T≥1). The UE 120 or the XR device 170 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120, the XR device 170, or another network node. Some network nodes 110 may not include radio frequency components that facilitate direct communication with the UE 120 or the XR device 170, such as one or more CUs, or one or more DUs.

At the network node 110, a transmit processor 220 may receive data, from a data source 212, intended for the UE 120 or the XR device 170 (or a set of UEs 120 or a set of XR devices 170). The transmit processor 220 may select one or more modulation and coding schemes (MCSs) for the UE 120 or the XR device 170 using one or more channel quality indicators (CQIs) received from that UE 120 or the XR device 170. The network node 110 may process (for example, encode and modulate) the data for the UE 120 or the XR device 170 using the MCS(s) selected for the UE 120 or the XR device 170 and may provide data symbols for the UE 120 or the XR device 170. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120 or the XR device 170, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive (RX) processor 258 may process (for example, demodulate and decode) the detected symbols, may provide decoded data for the UE 120 or the XR device 170 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 or the XR device 170 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120 or the XR device 170, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 or the XR device 170 may include a modulator and a demodulator. In some examples, the UE 120 or the XR device 170 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the network node 110, the uplink signals from UE 120 or the XR device 170 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120 or the XR device 170. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein.

The controller/processor 240 of the network node 110, the controller/processor 280 of the UE 120 or the XR device 170, and/or any other component(s) of FIG. 2 may perform one or more techniques associated with adaptive extended reality transmission rate for ultra-wide band communications, as described in more detail elsewhere herein. For example, the controller/processor 240 of the network node 110, the controller/processor 280 of the UE 120 or the XR device 170, and/or any other component(s) of FIG. 2 may perform or direct operations of, for example, method 600 of FIG. 6, method 700 of FIG. 7, and/or other processes as described herein. The memory 242 and the memory 282 may store data and program codes for the network node 110 and the UE 120 or the XR device 170, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110, the UE 120, and/or the XR device 170, may cause the one or more processors, the UE 120, the XR device 170, and/or the network node 110 to perform or direct operations of, for example, method 600 of FIG. 6, method 700 of FIG. 7, and/or other processes as described herein. In some examples, executing instructions may include running the instructions, converting the instructions, compiling the instructions, and/or interpreting the instructions, among other examples.

In some aspects, the XR device 170 includes means for receiving, via an ultra-wide band connection, a first transmission conveying first data for a frame, the first data being associated with a first XR frame quality and a first quantity of parity bits; means for transmitting a feedback message based at least in part on receiving the first transmission; and/or means for receiving, via the ultra-wide band connection and based at least in part on transmitting the feedback message, a second transmission conveying second data for the frame, the second data being associated with a second XR frame quality and a second quantity of parity bits. In some aspects, the means for the XR device 170 to perform operations described herein may include, for example, one or more of communication manager 172, antenna 252, modem 254, MIMO detector 256, receive processor 258, transmit processor 264, TX MIMO processor 266, controller/processor 280, or memory 282.

In some aspects, the UE 120 includes means for transmitting, via an ultra-wide band connection, a first message conveying first data for a frame, the first data being associated with a first XR frame quality and a first quantity of parity bits; means for receiving a feedback message based at least in part on transmitting the first message; and/or means for transmitting, via the ultra-wide band connection and based at least in part on receiving the feedback message, a second message conveying second data for the frame, the second data being associated with a second XR frame quality and a second quantity of parity bits. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, via an ultra-wide band connection, a first message conveying first data for a frame, the first data being associated with a first XR frame quality and a first quantity of parity bits; means for receiving a feedback message based at least in part on transmitting the first message; and/or means for transmitting, via the ultra-wide band connection and based at least in part on receiving the feedback message, a second message conveying second data for the frame, the second data being associated with a second XR frame quality and a second quantity of parity bits. In some aspects, the means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
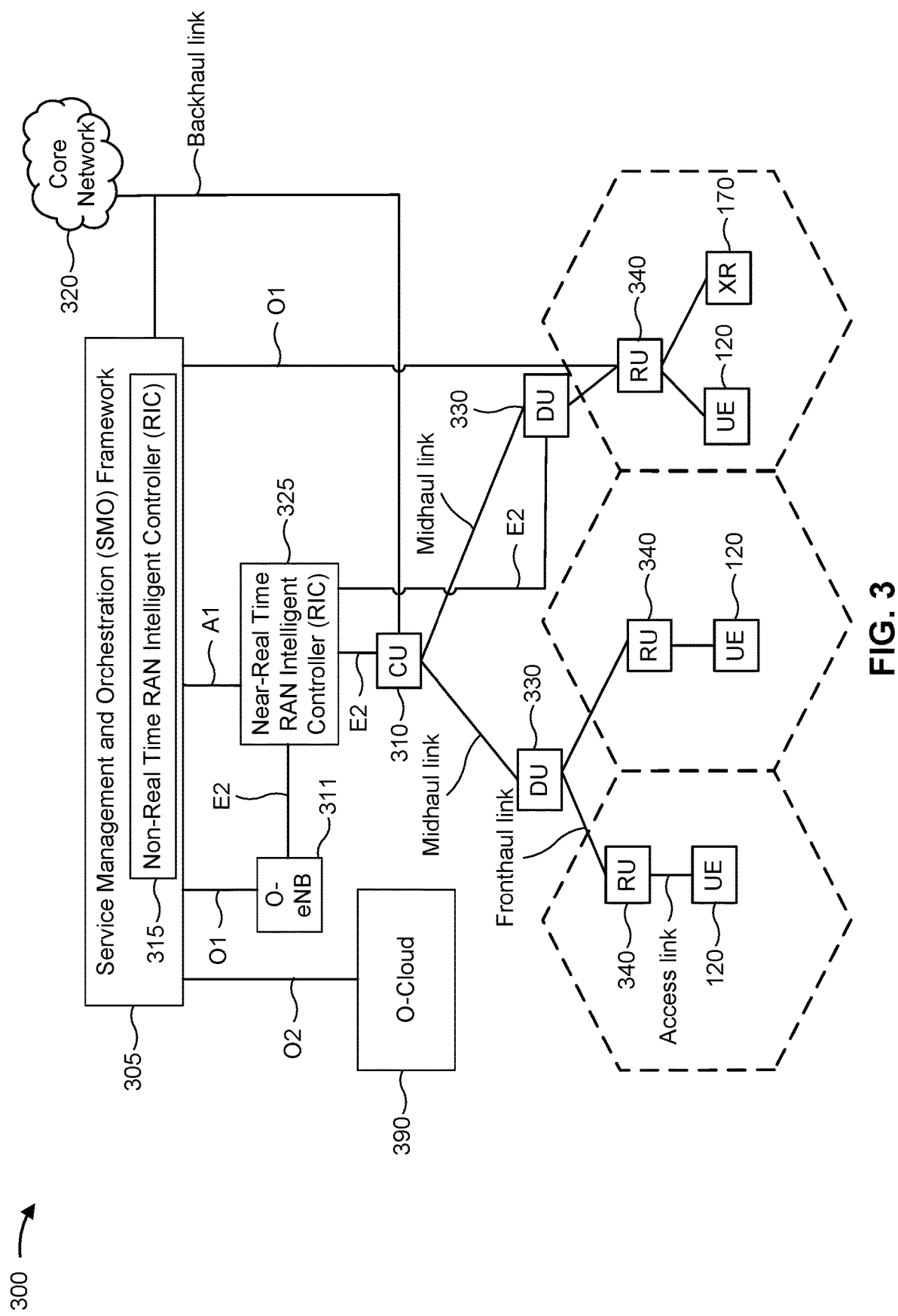
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 or XR devices 170 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120 or XR devices 170. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
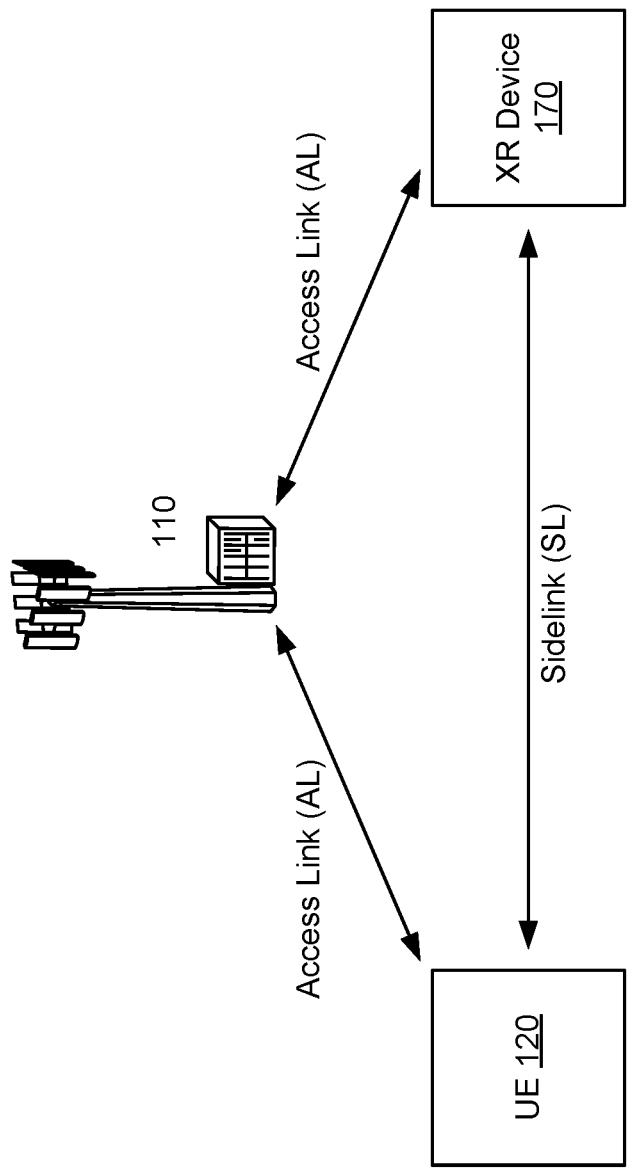
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a UE 120 and an XR device 170 may communicate with one another via a sidelink, as described above in connection with FIG. 4. As further shown, in some sidelink modes, a network node 110 may communicate with the UE 120 (e.g., directly or via one or more network nodes), such as via a first access link. Additionally, or alternatively, in some sidelink modes, the network node 110 may communicate with the XR device 170 (e.g., directly or via one or more network nodes), such as via a second access link. Thus, a direct link between the UE 120 and the XR device 170 (e.g., via an interface) may be referred to as a sidelink, and a direct link between a network 110 and a UE 120 or XR device 170 (e.g., via a Uu interface) may be referred to as an access link. Sidelink communications may be transmitted via the sidelink, and access link communications may be transmitted via the access link. An access link communication may be either a downlink communication (from a network node 110 to a UE 120 or an XR device 170) or an uplink communication (from a UE 120 or an XR device 170 to a network node 110).

As indicated above, FIG. 4 is provided as an example. Other examples may differ from what is described with respect to FIG. 4.

When communicating on a sidelink, an XR device and a UE may use ultra-wide band (UWB) frequencies, such as frequencies in a range of approximately 6 GHz to 10 GHz, which may be a portion of FR3, as described above. Ultra-wide band frequencies operate as unlicensed spectrum, which can result in unexpected interference, uncertain link quality, and/or sub-optimal utilization of spectrum resources. One technique for link adaptation, to account for using unlicensed spectrum for high-bandwidth communications (e.g., XR service), is to alter video quality based at least in part on channel conditions. In other words, the XR device may receive (e.g., from the UE) high quality video when channel quality is high and low quality video when channel quality is low. The "Shannon limit" or "Shannon bound" may refer to a maximum rate at which data can be conveyed given a channel bandwidth and a noise characteristic of the channel. The Shannon limit provides a theoretical limit for video quality as a function of instantaneous channel conditions. Achieving a video quality closer to the Shannon limit is indicative of a more efficient utilization of available channel resources than when a video quality is less close to the Shannon limit.

To achieve the above-mentioned alteration in video quality as channel quality alters, a communication system may have multiple streams with unequal error protection. For example, a UE may have a first amount of protection for first video data with a first coding rate and a second amount of protection for video data with a second coding rate. In this case, the first video data may be less granular than the second video data and the first coding rate may be more robust than the second coding rate. In this case, the UE transmits the multiple streams (e.g., to convey the first video data and the second video data). The XR device attempts to decode as many video streams as possible (e.g., a first video stream conveying the first data and a second video stream conveying the second data). When both the first data and the second data is decoded, the XR device can provide XR service with a relatively high frame quality (e.g., a relatively high video quality). When only the first data is able to be decoded (e.g., based at least in part on the first data having more robust protection than the second data), the XR device can still provide XR service, but with a relatively low frame quality. Although described in terms of two data streams, many data streams may be possible with different levels of granularity corresponding to different video resolutions and/or XR frame qualities.

However, transmitting multiple streams with unequal error protection results in a sub-optimal video quality (e.g., a video quality that is relatively far from the Shannon limit across a set of different channel quality characteristics). Accordingly, some aspects described herein enable adaptive XR transmission rate for ultra-wide band communications. For example, an XR device may receive a set of transmissions for an XR frame with the set of transmissions differing with respect to XR frame quality and/or parity bits based at least in part on feedback transmissions. In this case, the XR device may receive a first transmission with first data for an XR frame and transmit a feedback message indicating whether the first transmission is successfully received. In this case, when the first transmission succeeds, the XR device receives second data with a finer granularity for the XR frame (e.g., resulting in a higher XR frame quality when the first data and the second data are combined than is achieved from just the first data). Alternatively, when the first transmission does not succeed, the XR device receives second data with additional parity bits (e.g., resulting in a higher likelihood that the XR device successfully decodes the second data and is able to provide the XR frame despite not successfully receiving the first transmission). In this case, a quantity of re-transmissions of data associated with the same XR frame can be a fixed quantity, which can avoid unpredictable delay in providing the XR frame (e.g., for display) relative to using an adaptively determined quantity of re-transmissions. In this way, the XR device can provide an XR frame quality that is closer to the Shannon limit than is achieved by other techniques, thereby indicating a more efficient or optimal usage of network resources.

Some aspects described herein enable use of a fixed quantity of re-transmissions of data for an XR frame, with each the re-transmissions having different XR frame qualities or different quantities of parity bits. For example, an XR device may receive (e.g., from a UE) a first transmission that includes first data for an XR frame with a first frame quality (e.g., a first resolution) and a first quantity of parity bits. The XR device may transmit a feedback message indicating whether the first transmission was successful and may receive a second transmission with additional data for the XR frame. In this case, when the feedback message indicates successful receipt of the first transmission, the additional data can be used for a second frame quality (e.g., a second resolution) that is better than the first frame quality. In contrast, when the feedback message indicates a failure of the first transmission, the additional data can be used for a second quantity of parity bits that is greater than the first quantity of parity bits. In this way, the XR device, a UE, and/or a network node can ensure a more efficient use of network resources and achievement of a higher resolution for XR services without introducing an unpredictable delay in data transfer for the XR services.

Figure 5A:
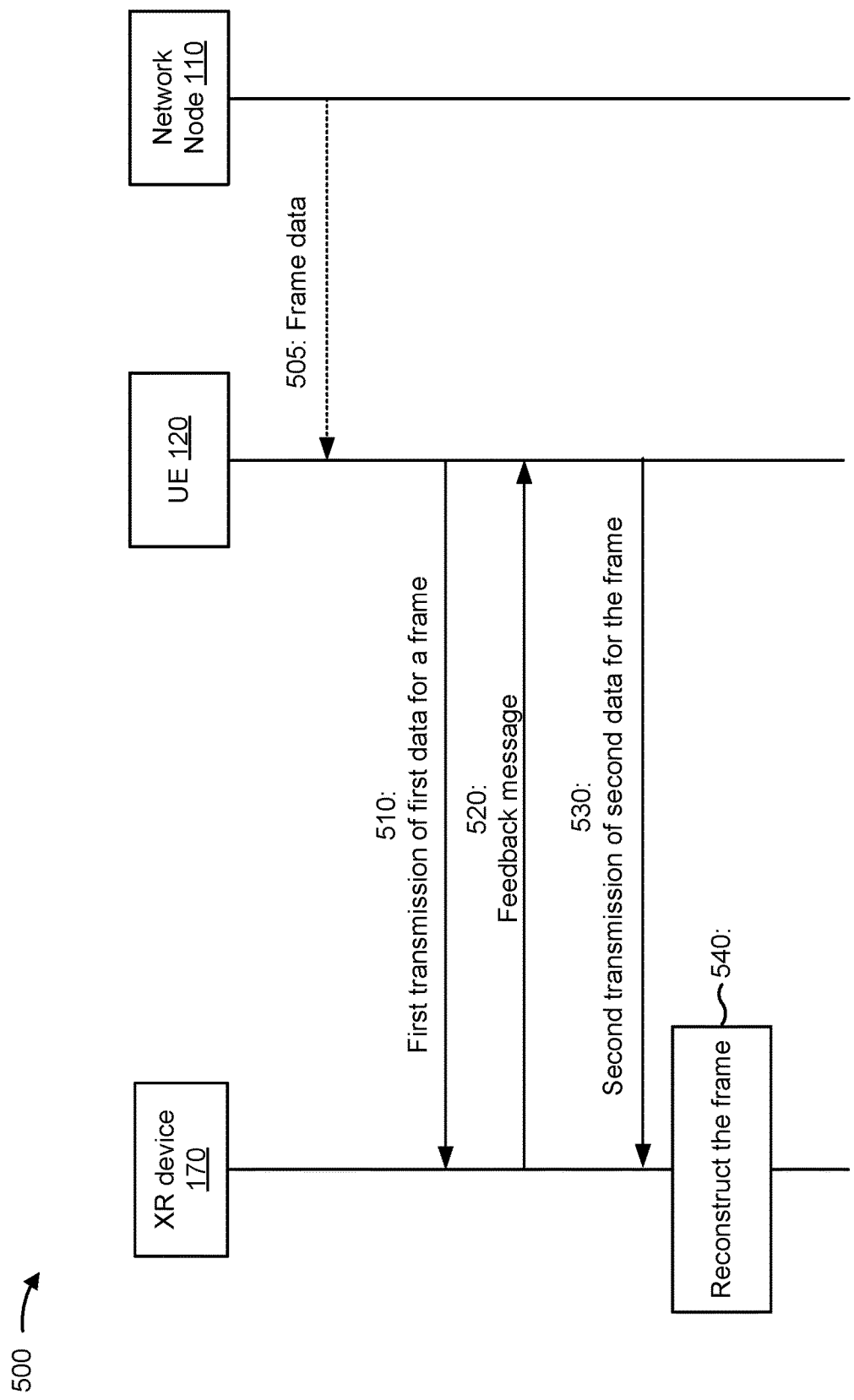
FIGS. 5A-5C are diagrams illustrating an example associated with adaptive XR transmission rate for ultra-wide band communications, in accordance with the present disclosure.
Figure 5B:
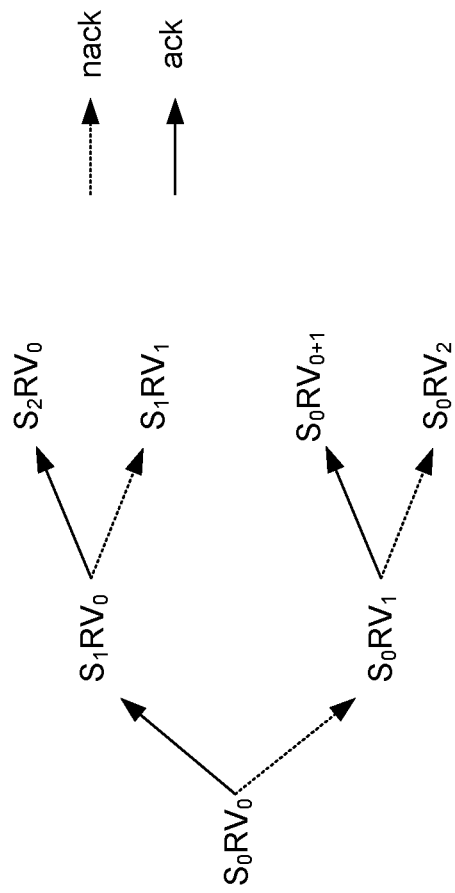
Figure 5C:
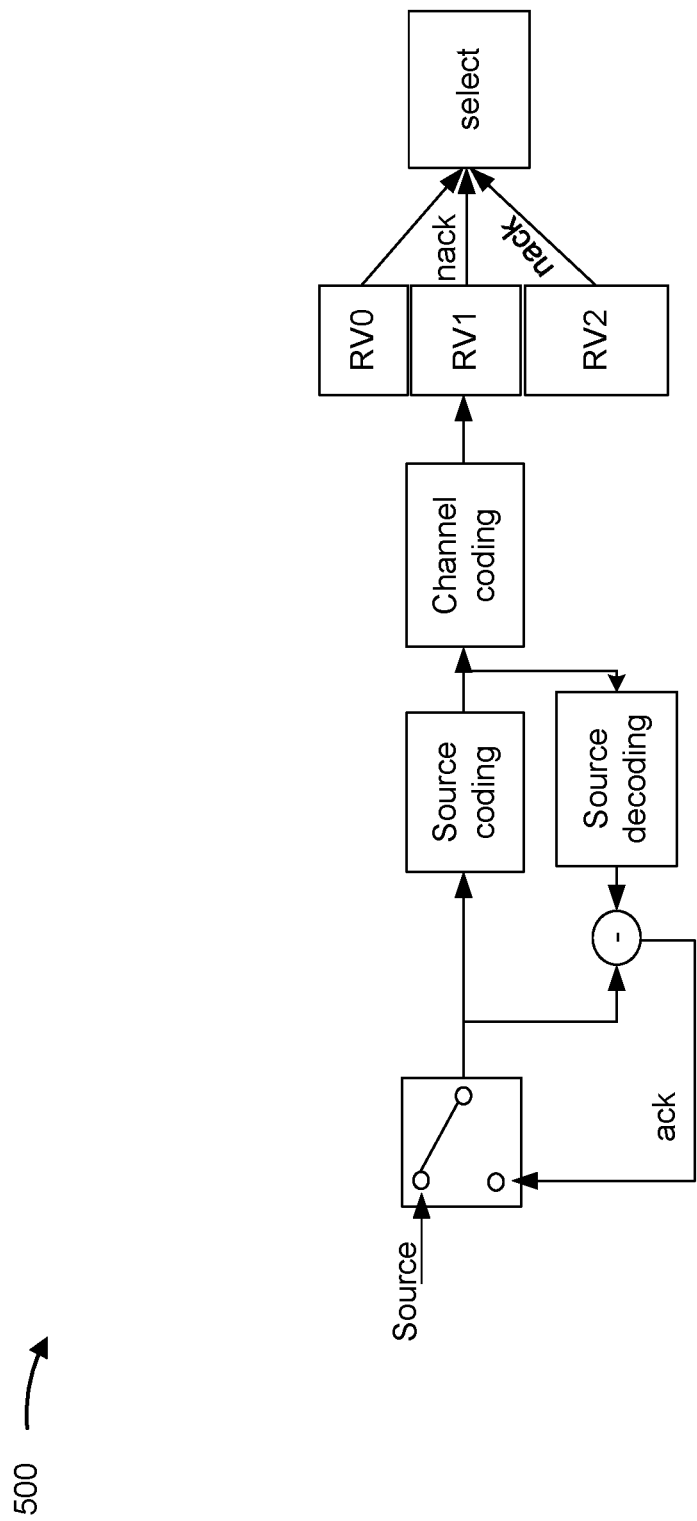

FIGS. 5A-5C are diagrams illustrating an example 500 associated with adaptive XR transmission rate for ultra-wide band communications, in accordance with the present disclosure. As shown in FIG. 5A, example 500 includes communication between a network node 110, a UE 120, and an XR device 170.

As further shown in FIG. 5A, and at 505, in some aspects, the UE 120 may receive frame data from a network node 110. For example, the UE 120 may receive information associated with providing an XR frame for display at the XR device 170 in connection with an XR service. In some aspects, the frame data may be deconstructed or divided into a plurality of datasets associated with the frame. For example, the network node 110 may process the XR frame to divide data associated with the XR frame into a plurality of datasets with different granularities. The different granularities may refer to different features of the XR frame that are conveyed with each transmission of each dataset.

In other words, the different granularities may refer to different resolutions, such as a first dataset of first data representing the frame at a first, low resolution, a second dataset of second data representing the frame at a second, medium resolution (either alone or in combination with the first data), and a third dataset of third data representing the frame at a third, high resolution (either alone or in combination with the first and/or second data). In another example, different datasets may convey different fields of view, such as a first dataset conveying first data associated with rendering an XR frame in a relatively narrow field of view, the second dataset conveying second data associated with rendering the XR frame in a relatively medium field of view, and the third dataset conveying third data associated with rendering the XR frame in a relatively wide field of view. Additionally, or alternatively, different datasets may have differences with respect to another property, such as a shading, a coloring, a depth of view, an amount of information, or another property that may be divided into a plurality of granularities.

In some aspects, the network node 110 may transmit data associated with an XR frame without deconstructing or dividing the data. For example, the network node 110 may transmit data to the UE 120 and the UE 120 may deconstruct the data for transmission to the XR device 170 across a plurality of transmissions. In this case, the XR device 170 may deconstruct the data based at least in part on a channel condition, a channel bandwidth, an XR device 170 capability, a subcarrier spacing, a video rate, a channel latency, a feedback latency associated with a feedback transmission, as described below, or a latency requirement of the XR service, among other examples.

In some aspects, the network node 110 may transmit information identifying a configuration for the UE 120 and the XR device 170 to use for transmitting data associated with an XR service. For example, the network node 110 may transmit configuration information identifying a quantity of transmissions for each frame, a set of source redundancy versions for each frame, a size for the source redundancy versions, a reconstruction rule for reconstructing each frame, a set of channel redundancy versions (e.g., which may be of equal or unequal size, adaptively determined and signaled or fixed, or band-specific or applicable to a plurality of bands), whether retransmission can be mixed with new information (e.g., whether a retransmission for a first frame can be included in the same transmission as a new transmission for a second frame), a type of gap to capacity feedback that can be used, or a transmitter behavior for gap to capacity signaling, among other examples, as described in more detail below. Additionally, or alternatively, one or more parameters of the configuration information may be statically defined (e.g., in a specification) for the UE 120 and/or the XR device 170. Additionally, or alternatively, the UE 120 may select one or more parameters of the configuration information (e.g., without the network node 110 or based at least in part on some set of available parameters identified by the network node 110) and signaled to the XR device 170.

As further shown in FIG. 5A, and at 510, the XR device 170 may receive a first transmission from the UE 120. For example, the XR device 170 may receive a first transmission conveying first data for a particular frame associated with an XR service. In some aspects, the first transmission may include first data associated with a first XR characteristic. For example, the first data may be associated with a first frame quality, such as a first resolution, a first field-of-view, a first shading, a first coloring, a first depth-of-view, or a first information content, among other examples.

As further shown in FIG. 5A, and at 520, the XR device 170 may transmit a feedback message to the UE 120. For example, the XR device 170 may transmit a hybrid automatic repeat request (HARQ) feedback message to convey information indicating whether the first transmission was successfully received and decoded (e.g., a HARQ acknowledgment (ACK)) or was not successfully received and decoded (e.g., a HARQ negative acknowledgment (NACK)).

As further shown in FIG. 5A, and at 530, the XR device 170 may receive a second transmission from the UE 120. For example, the XR device 170 may receive a second transmission conveying second data for the particular frame associated with the XR service. In some aspects, the second transmission may include second data associated with a second XR characteristic. For example, the second data may be associated with a second frame quality, such as a second resolution, a second field-of-view, a second shading, a second coloring, a second depth-of-view, or a second information content, among other examples. Additionally, or alternatively, the second transmission may include second data associated with a second level of reliability. For example, the first transmission may include a first quantity of parity bits for incremental redundancy (IR) HARQ (IR-HARQ) and the second transmission may include a second quantity of parity bits for IR-HARQ.

In some aspects, the UE 120 may generate the second transmission to differ from the first transmission in a manner that is based at least in part on a content of the feedback message. For example, when the UE 120 receives a HARQ ACK message, the UE 120 may transmit a second transmission that includes additional bits in the second data for conveying finer granularity for the particular frame (e.g., a higher frame quality or resolution relative to the first data conveyed in the first transmission). In contrast, when the UE 120 receives a HARQ NACK message, the UE 120 may transmit a second transmission that includes additional bits in the second data for conveying additional parity bits for the particular frame (e.g., increasing a likelihood of successful receipt and decoding relative to the first transmission).

FIGS. 5B and 5C show an example of the above-mentioned retransmission. For example, as shown in FIG. 5B, a first transmission, from the UE 120 to the XR device 170, may include content $S_0RV_0$, where S represents a source redundancy version (e.g., a content of the particular frame that is conveyed) and RV represents a channel redundancy version (RV) of the particular frame. As further shown in FIG. 5B, when the UE 120 receives a HARQ NACK as a response to the first transmission, the UE 120 transmits a second transmission with content $S_0RV_1$ (e.g., the same frame content, but a higher RV representing a more parity bits). In contrast, when the UE 120 receives a HARQ ACK as a response to the first transmission, the UE 120 transmits a second transmission with content $S_1RV_0$, indicating more granular data for the particular frame and the same redundancy version as the first transmission. Similarly, for a third transmission, the UE 120 may transmit $S_2RV_0$ after another HARQ ACK received for the second transmission (which, itself, was based at least in part on a received HARQ ACK). In contrast, for a third transmission based on a NACK to the first transmission (Tx1) and an ACK to the second transmission (Tx2), the UE 120 may transmit a content of $S_1RV_{0+1}$. In this case, content $S_0$ is not successfully conveyed in Tx1, but is conveyed in Tx2. Further, Tx2 uses redundancy version $RV_1$ based on Tx1 using redundancy version $RV_0$ unsuccessfully. In Tx3, UE 120 uses redundancy version $RV_{0+1}$, which refers to the UE 120 using both $RV_0$ and $RV_1$ for Tx3 with a quantity of source bits S being reduced to accommodate additional parity bits.

FIG. 5C shows an example of a feedback loop for coding transmissions at the UE 120. For example, a redundancy version RV0, RV1, or RV2 are generated by channel coding and stored in a buffer. RV0 is read out of the buffer and transmitted and, if a HARQ NACK is received, RV1 is then read out of the buffer and transmitted. In contrast, when a HARQ ACK is received, S1 is encoded and replaces a content of the buffer (e.g., S0-related RVs are removed and S1-related RVs are stored in the buffer as a replacement). In some aspects, as shown, unequal sized RVs may be used to represent different (unequal) amounts of channel adaptation that are performed after each successive HARQ feedback message. Although FIGS. 5A-5C are described in terms of two or three transmissions (which may also be referred to as "re-transmissions" or "repetitions"), additional quantities of transmissions are contemplated.

In some aspects, the UE 120 may combine transmission of digital data with transmission of analog data. For example, the UE 120 may split a channel bandwidth of a channel for the second transmission into a first bandwidth 1/b and a second bandwidth (b−1)/b, where b is based at least in part on channel conditions and/or a requested peak signal-to-noise ratio (pSNR), such as b=log(pSNR)/log(1+ SNR). In this case, the UE 120 may use a first transmit chain (e.g., a digital transmit chain) to process and transmit a first portion of the second transmission and a second transmit chain (e.g., an analog transmit chain) to process and transmit a second portion of the second transmission (e.g., using frequency division multiplexing (FDM) or another technique). By using combined digital and analog coding in connection with retransmission with different granularities, as described above, the UE 120 and the XR device 170 may use network resources more efficiently (e.g., closer to a Shannon limit).

In some aspects, the UE 120 may include redundancy versions for different granularities of data to fill resources of a slot. For example, the UE 120 may for the second transmission, include a first redundancy version for the first data with a first frame quality and a second redundancy version for the second data with a second frame resolution to fill a data container (e.g., resources of one slot for the second transmission). In this case, the UE 120 may use a data code rate that matches an aggregated code rate of the re-transmitted data. Additionally, or alternatively, the UE 120 may include data associated with a plurality of frames in a single transmission. For example, the UE 120 may include, in the second transmission, a re-transmission of first data for a first frame and a new transmission of first data for a second frame.

In some aspects, the UE 120 may determine a gap to capacity or a gap to decoding. The gap to capacity or gap to decoding may refer to an amount of redundancy that is sent to ensure that the decoder is successful (e.g., based at least in part on a channel characteristic, such as a normalized SNR, which measures how far a given coding scheme is operating from successful decoding). When the XR device 170 is to transmit a HARQ NACK as a response to the first transmission, the gap to capacity can be calculated, for example, at the XR device 170 and signaled as feedback to the UE 120. In this case, a coding rate of a next transmission by the UE 120 (e.g., the second transmission) is based at least in part on the gap to capacity. In some aspects, the coding rate may be determined adaptively based at least in part on the gap to capacity (e.g., on a band-specific basis), thereby enabling accommodation of varying degrees of unknown channel conditions. By determining the coding rate based at least in part on the gap to capacity, the UE 120 may achieve a relatively high likelihood of the XR device 170 successfully decoding the second transmission. In this case, the UE 120 may transmit a third transmission to provide a finer level of granularity for the particular frame and may use the same coding rate for the third transmission as is achieved by a combination of the first transmission and the second transmission.

As further shown in FIG. 5A, and at 540, the XR device 170 may reconstruct a frame. For example, the XR device 170 may reconstruct the particular frame using the first data of the first transmission, the second data of the second transmission, and/or nth data of an nth transmission, among other examples. In this case, the XR device 170 may combine successfully decoded first data from the first transmission with successfully decoded second data from the second transmission, which may be a residual of the first data of the first transmission, to provide a relatively high resolution frame. In contrast, when the first transmission is not successfully decoded but the second transmission is successfully decoded, the XR device 170 may reconstruct the particular frame from first data re-transmitted in the second transmission to provide a relatively low resolution frame. In some aspects, the XR device 170 may split data by frame. For example, the XR device 170 may receive data for a first frame and data for a second frame in the same transmission, as described above, and may split the data to construct the first frame and the second frame separately.

As indicated above, FIGS. 5A-5C are provided as an example. Other examples may differ from what is described with respect to FIGS. 5A-5C.

Figure 6:
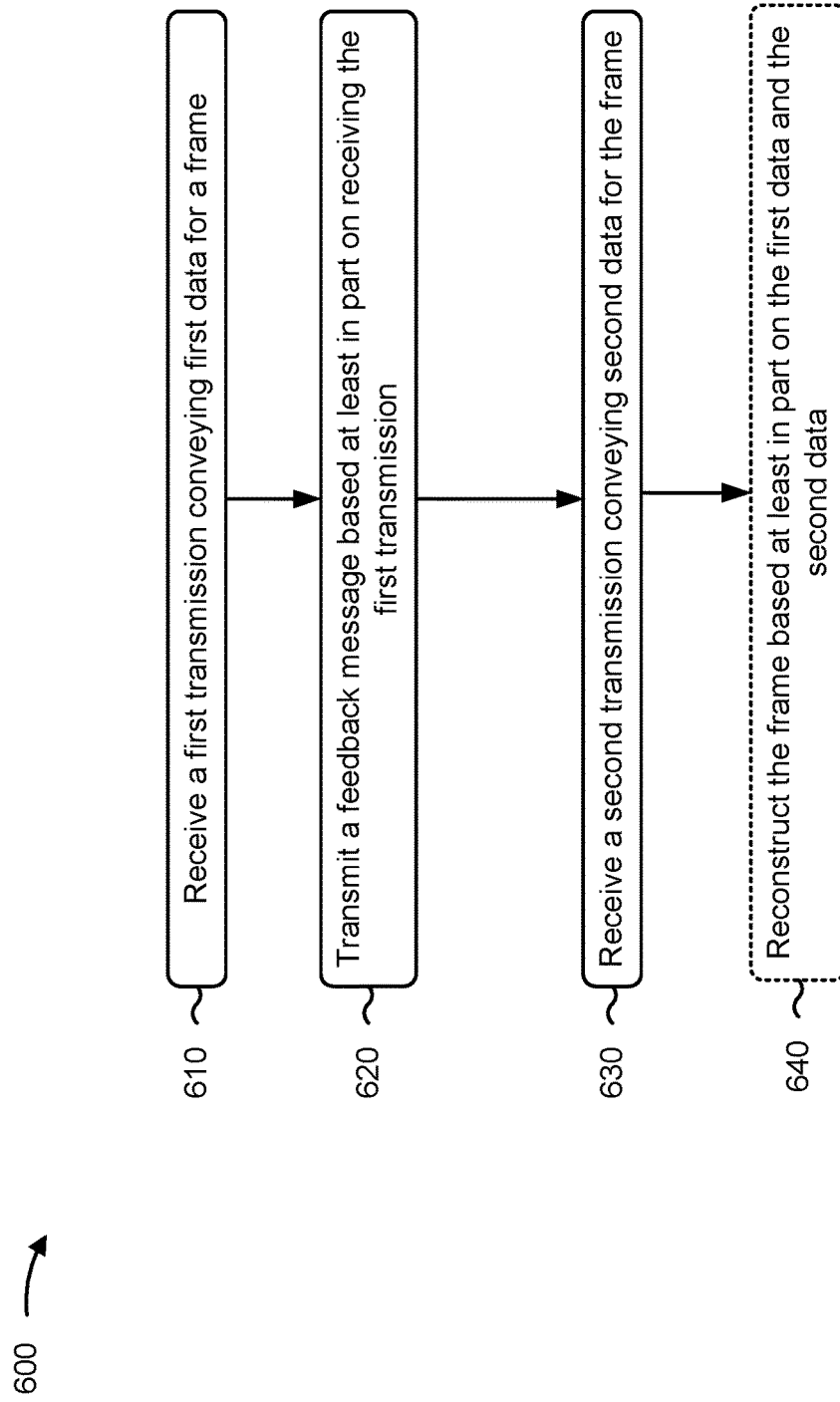
FIG. 6 is a flowchart of an example method of wireless communication.

FIG. 6 is a flowchart of an example method 600 of wireless communication. The method 600 may be performed by, for example, an XR device (e.g., the XR device 170).

At 610, the XR device may receive a first transmission conveying first data for a frame. For example, the XR device (e.g., using communication manager 172 and/or reception component 802, depicted in FIG. 8) may receive, via an ultra-wide band connection, a first transmission conveying first data for a frame, the first data being associated with a first XR frame quality and a first quantity of parity bits, as described above in connection with, for example, FIG. 5A and at 510. In some aspects, a quantity of re-transmissions for the frame is a fixed quantity applicable to each frame of a set of frames that includes the frame.

At 620, the XR device may transmit a feedback message based at least in part on receiving the first transmission. For example, the XR device (e.g., using communication manager 172 and/or transmission component 804, depicted in FIG. 8) may transmit a feedback message based at least in part on receiving the first transmission, as described above in connection with, for example, FIG. 5A and at 520. In some aspects, the feedback message is an acknowledgment message, and the first data is associated with the first XR frame quality and the second data Is associated with the second XR frame quality, the second data being based at least in part on a residual of the first data. In some aspects, the feedback message is a negative acknowledgment message, and the first data is associated with the first quantity of parity bits and the second data is associated with the second quantity of parity bits.

At 630, the XR device may receive a second transmission conveying second data for the frame. For example, the XR device (e.g., using communication manager 172 and/or reception component 802, depicted in FIG. 8) may receive, via the ultra-wide band connection and based at least in part on transmitting the feedback message, a second transmission conveying second data for the frame, the second data being associated with a second XR frame quality and a second quantity of parity bits, as described above in connection with, for example, FIG. 5A and at 530.

In some aspects, the first XR frame quality is different from the second XR frame quality. In some aspects, the first quantity of parity bits is different from the second quantity of parity bits. In some aspects, the second data includes more data than the first data, and additional data of the second data relative to the first data is used for additional XR data associated with the second XR frame quality relative to the first XR frame quality or additional parity bits associated with the second quantity of parity bits relative to the first quantity of parity bits. In some aspects, a channel bandwidth of the ultra-wide band connection includes a first sub-bandwidth for transmission of digital data relating to the frame and a second sub-bandwidth for transmission of analog data relating to the frame, the digital data and analog data relating to the frame including the first data and the second data. In some aspects, the second transmission includes a first set of resources conveying the second data for the frame and a second set of resources conveying third data relating to another frame.

In some aspects, a data code rate of the second transmission is an aggregated code rate based at least in part on the first transmission and the second transmission. In some aspects, a size of the second transmission is based at least in part on a gap to capacity associated with the first transmission. In some aspects, a third transmission conveying third data for the frame is associated with a third XR frame quality and a combined data code rate of the first transmission and the second transmission. In some aspects, one or more parameters associated with a configuration of the first transmission or the second transmission include a predetermined parameter or a signaled parameter, the configuration being associated with at least one of a quantity of transmissions for the frame, a source redundancy version for the frame, a channel redundancy version for the frame, a quantity of frames for which data is conveyed in each transmission, or a gap to capacity feedback for the frame.

At 640, in some aspects, the XR device may reconstruct the frame based at least in part on the first data and the second data. For example, the XR device (e.g., using communication manager 172 and/or reception component 802, depicted in FIG. 8) may reconstruct the frame, as described above in connection with, for example, FIG. 5A and at 540.

Although FIG. 6 shows example blocks of method 600, in some aspects, method 600 may include additional blocks, fewer blocks, different blocks, or differently arranged blocks than those depicted in FIG. 6. Additionally, or alternatively, two or more of the blocks of method 600 may be performed in parallel.

Figure 7:
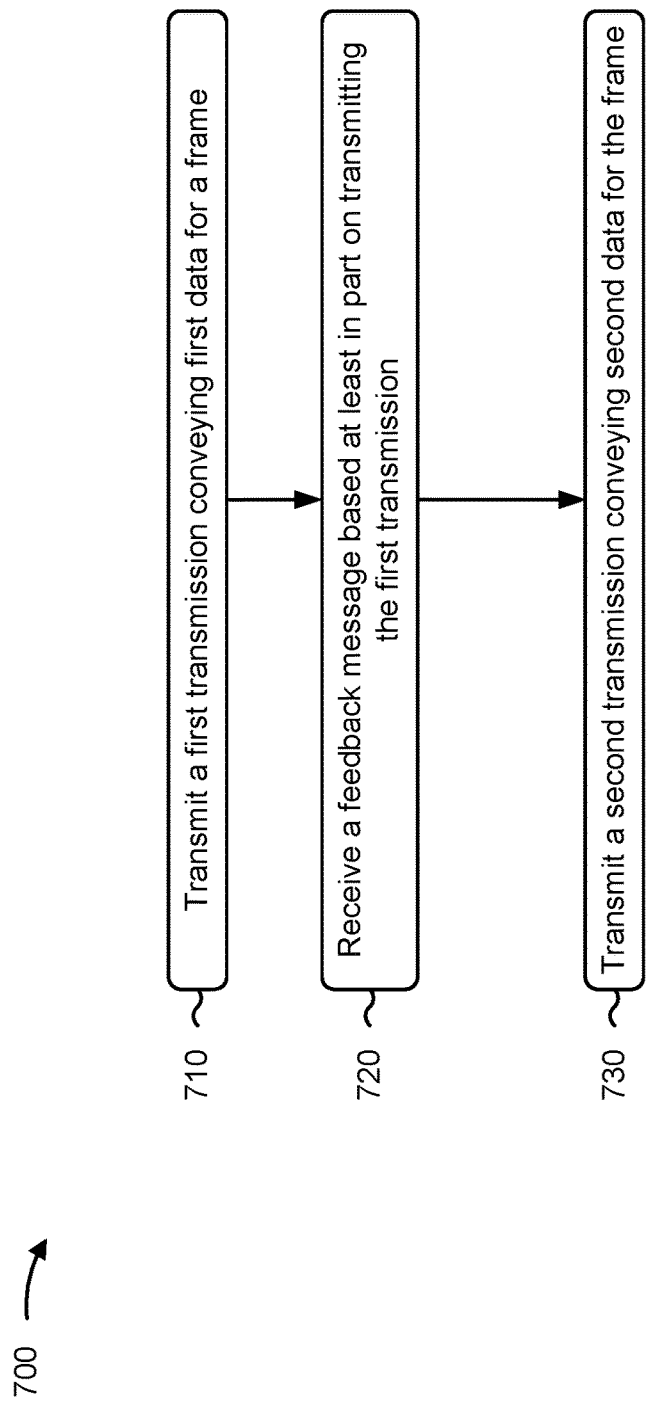
FIG. 7 is a flowchart of an example method of wireless communication.

FIG. 7 is a flowchart of an example method 700 of wireless communication. The method 700 may be performed by, for example, a UE (e.g., UE 120). In another example, the method 700 may be performed by another device, such as a network node (e.g., network node 110).

At 710, the UE may transmit a first message conveying first data for a frame. For example, the UE (e.g., using communication manager 140 and/or transmission component 1004, depicted in FIG. 10) may transmit, via an ultra-wide band connection, a first message conveying first data for a frame, the first data being associated with a first XR frame quality and a first quantity of parity bits, as described above in connection with, for example, FIG. 5A and at 510. In some aspects, a quantity of re-transmissions for the frame is a fixed quantity applicable to each frame of a set of frames that includes the frame. In some aspects, a channel bandwidth of the ultra-wide band connection includes a first sub-bandwidth for transmission of digital data relating to the frame and a second sub-bandwidth for transmission of analog data relating to the frame, the digital data and analog data relating to the frame including the first data and the second data.

At 720, the UE may receive a feedback message based at least in part on transmitting the first message. For example, the UE (e.g., using communication manager 140 and/or reception component 1002, depicted in FIG. 10) may receive a feedback message based at least in part on transmitting the first message, as described above in connection with, for example, FIG. 5A and at 520. In some aspects, the feedback message is an acknowledgment message, and the first data is associated with the first XR frame quality and the second data is associated with the second XR frame quality, the second data being based at least in part on a residual of the first data. In some aspects, the feedback message is a negative acknowledgment message, and the first data is associated with the first quantity of parity bits and the second data is associated with the second quantity of parity bits.

At 730, the UE may transmit a second message conveying second data for the frame. For example, the UE (e.g., using communication manager 140 and/or transmission component 1004, depicted in FIG. 10) may transmit, via the ultra-wide band connection and based at least in part on receiving the feedback message, a second message conveying second data for the frame, the second data being associated with a second XR frame quality and a second quantity of parity bits, as described above in connection with, for example, FIG. 5A and at 530. In some aspects, the first XR frame quality is different from the second XR frame quality. In some aspects, the first quantity of parity bits is different from the second quantity of parity bits. In some aspects, the second data includes more data than the first data, and additional data of the second data relative to the first data is used for additional XR data associated with the second XR frame quality relative to the first XR frame quality or additional parity bits associated with the second quantity of parity bits relative to the first quantity of parity bits.

In some aspects, the second message includes a first set of resources conveying the second data for the frame and a second set of resources conveying third data relating to another frame. In some aspects, a data code rate of the second message is an aggregated code rate based at least in part on the first message and the second message. In some aspects, a size of the second message is based at least in part on a gap to capacity associated with the first message. In some aspects, a third message conveying third data for the frame is associated with a third XR frame quality and a combined data code rate of the first message and the second message. In some aspects, one or more parameters associated with a configuration of the first message or the second message include a predetermined parameter or a signaled parameter, the configuration being associated with at least one of a quantity of messages for the frame, a source redundancy version for the frame, a channel redundancy version for the frame, a quantity of frames for which data is conveyed in each message, or a gap to capacity feedback for the frame.

Although FIG. 7 shows example blocks of method 700, in some aspects, method 700 may include additional blocks, fewer blocks, different blocks, or differently arranged blocks than those depicted in FIG. 7. Additionally, or alternatively, two or more of the blocks of method 700 may be performed in parallel.

Figure 8:
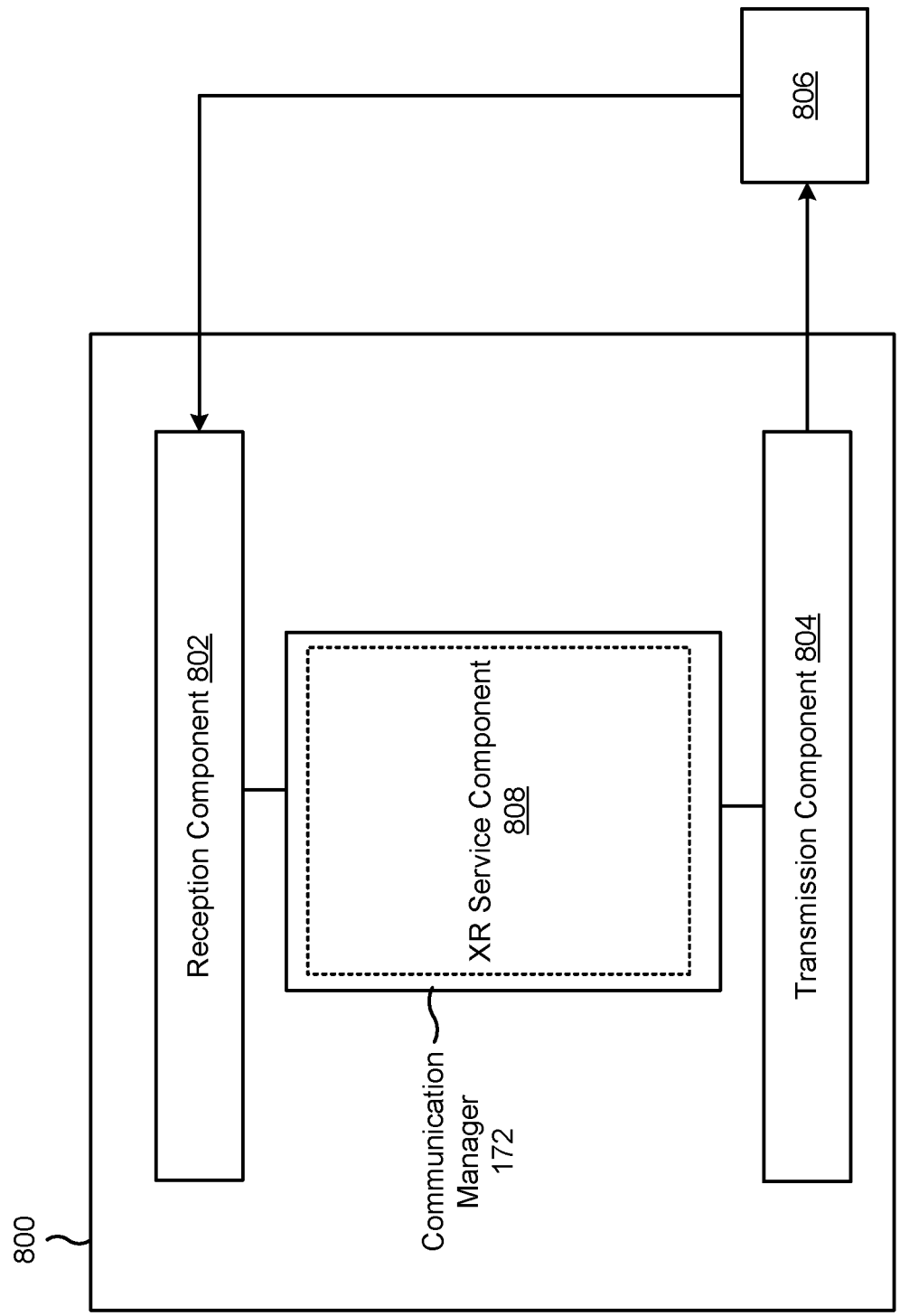
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be an XR device, or an XR device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 172. The communication manager 172 may include one or more of an XR service component 808 among other examples.

In some aspects, the apparatus 800 may be configured to perform one or more operations described herein in connection with FIGS. 5A-5C. Additionally, or alternatively, the apparatus 800 may be configured to perform one or more processes described herein, such as method 600 of FIG. 6.

In some aspects, the apparatus 800 and/or one or more components shown in FIG. 8 may include one or more components of the XR device described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the XR device described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the XR device described in connection with FIG. 2. In some aspects, the transmission component 804 may be co-located with the reception component 802 in a transceiver.

The reception component 802 may receive, via an ultra-wide band connection, a first transmission conveying first data for a frame, the first data being associated with a first XR frame quality and a first quantity of parity bits. The transmission component 804 may transmit a feedback message based at least in part on receiving the first transmission. The reception component 802 may receive, via the ultra-wide band connection and based at least in part on transmitting the feedback message, a second transmission conveying second data for the frame, the second data being associated with a second XR frame quality and a second quantity of parity bits. The XR service component 808 may reconstruct the frame based at least in part on the first data and the second data.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
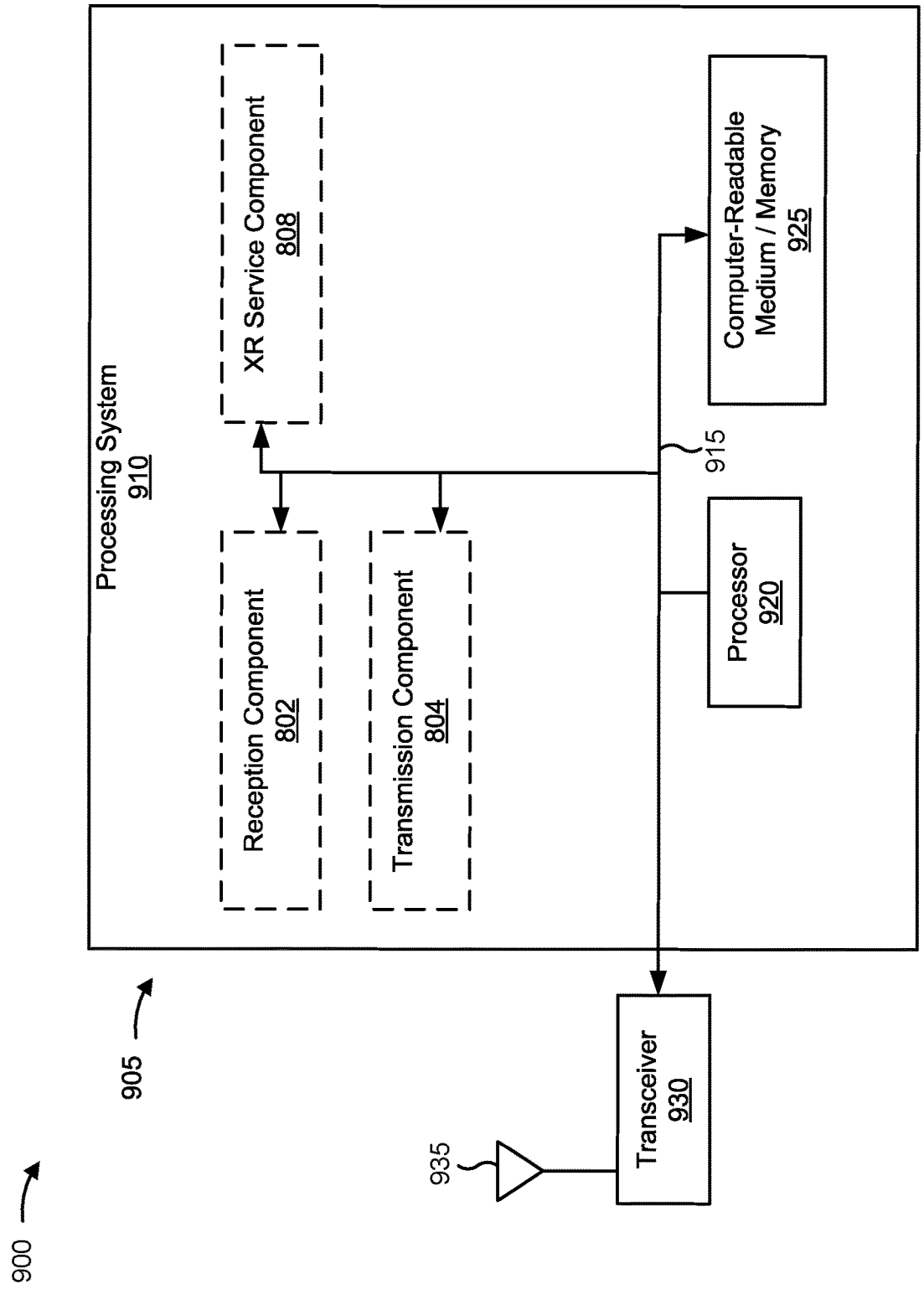
FIG. 9 is a diagram illustrating an example of a hardware implementation for an apparatus employing a processing system, in accordance with the present disclosure.

FIG. 9 is a diagram illustrating an example 900 of a hardware implementation for an apparatus 905 employing a processing system 910, in accordance with the present disclosure. The apparatus 905 may be a XR device.

The processing system 910 may be implemented with a bus architecture, represented generally by the bus 915. The bus 915 may include any number of interconnecting buses and bridges depending on the specific application of the processing system 910 and the overall design constraints. The bus 915 links together various circuits including one or more processors and/or hardware components, represented by the processor 920, the illustrated components, and the computer-readable medium/memory 925. The bus 915 may also link various other circuits, such as timing sources, peripherals, voltage regulators, and/or power management circuits.

The processing system 910 may be coupled to a transceiver 930. The transceiver 930 is coupled to one or more antennas 935. The transceiver 930 provides a means for communicating with various other apparatuses over a transmission medium. The transceiver 930 receives a signal from the one or more antennas 935, extracts information from the received signal, and provides the extracted information to the processing system 910, specifically the reception component 802. In addition, the transceiver 930 receives information from the processing system 910, specifically the transmission component 804, and generates a signal to be applied to the one or more antennas 935 based at least in part on the received information.

The processing system 910 includes a processor 920 coupled to a computer-readable medium/memory 925. The processor 920 is responsible for general processing, including the execution of software stored on the computer-readable medium/memory 925. The software, when executed by the processor 920, causes the processing system 910 to perform the various functions described herein for any particular apparatus. The computer-readable medium/memory 925 may also be used for storing data that is manipulated by the processor 920 when executing software. The processing system further includes at least one of the illustrated components. The components may be software modules running in the processor 920, resident/stored in the computer readable medium/memory 925, one or more hardware modules coupled to the processor 920, or some combination thereof.

In some aspects, the processing system 910 may be a component of the XR device 170 and may include the memory 282 and/or at least one of the TX MIMO processor 266, the RX processor 258, and/or the controller/processor 280. In some aspects, the apparatus 905 for wireless communication includes means for receiving, via an ultra-wide band connection, a first transmission conveying first data for a frame, the first data being associated with a first XR frame quality and a first quantity of parity bits; means for transmitting a feedback message based at least in part on receiving the first transmission; and means for receiving, via the ultra-wide band connection and based at least in part on transmitting the feedback message, a second transmission conveying second data for the frame, the second data being associated with a second XR frame quality and a second quantity of parity bits. The aforementioned means may be one or more of the aforementioned components of the apparatus 800 and/or the processing system 910 of the apparatus 905 configured to perform the functions recited by the aforementioned means. As described elsewhere herein, the processing system 910 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 9 is provided as an example. Other examples may differ from what is described in connection with FIG. 9.

Figure 10:
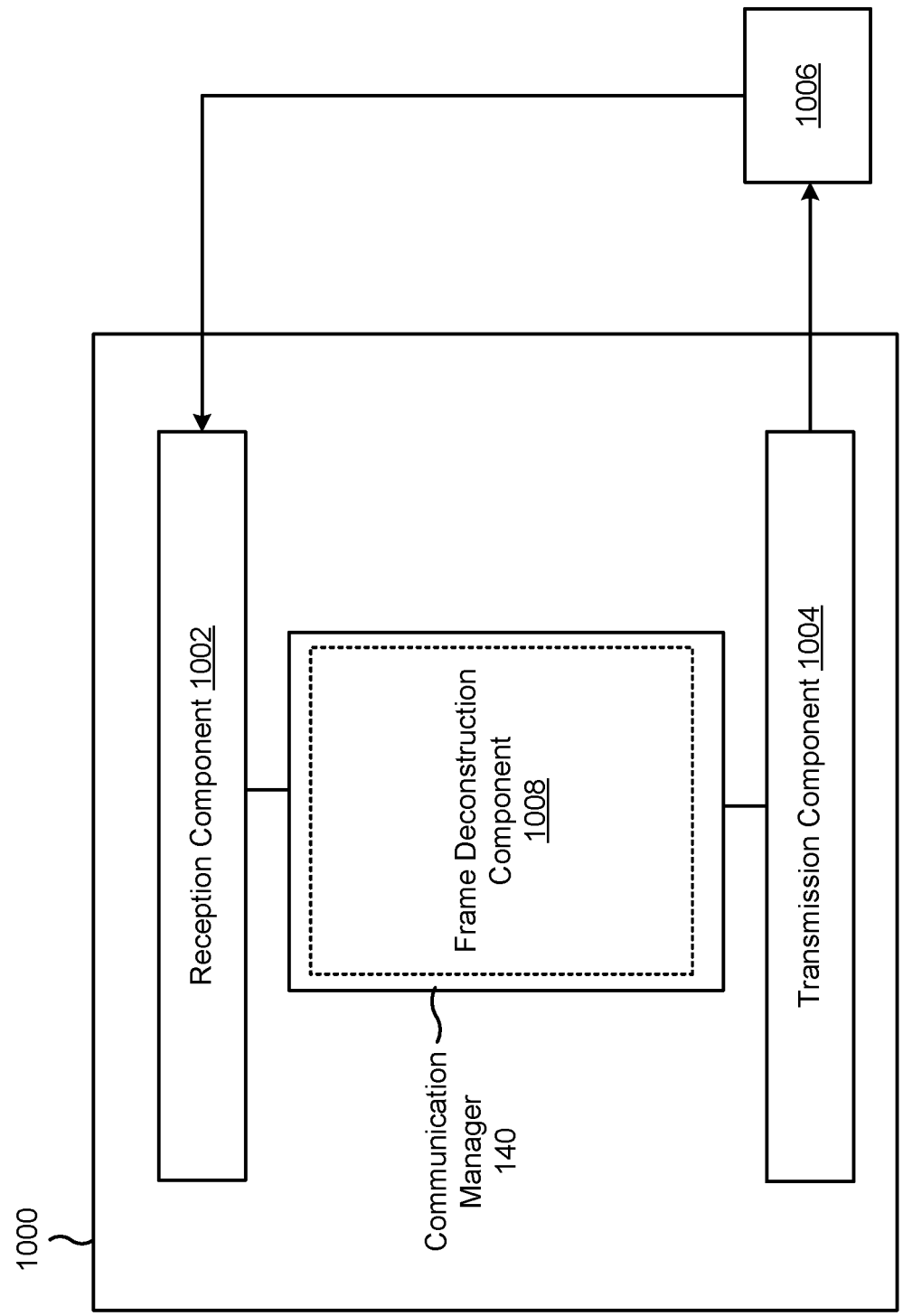
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In another example, the apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a frame deconstruction component 1008, among other examples. In another example, when the apparatus 1000 is a network node, the apparatus 1000 may include a communication manager 150.

In some aspects, the apparatus 1000 may be configured to perform one or more operations described herein in connection with FIGS. 5A-5C. Additionally, or alternatively, the apparatus 1000 may be configured to perform one or more processes described herein, such as method 700 of FIG. 7. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The transmission component 1004 may transmit, via an ultra-wide band connection, a first message conveying first data for a frame, the first data being associated with a first XR frame quality and a first quantity of parity bits. The reception component 1002 may receive a feedback message based at least in part on transmitting the first message. The transmission component 1004 may transmit, via the ultra-wide band connection and based at least in part on receiving the feedback message, a second message conveying second data for the frame, the second data being associated with a second XR frame quality and a second quantity of parity bits. The frame deconstruction component 1008 may deconstruct an XR frame into a sets of data, such as first data, second data, or nth data, with different resolutions and may transmit the sets of data via a set of transmissions, such as a first message, a second message, or an nth message.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
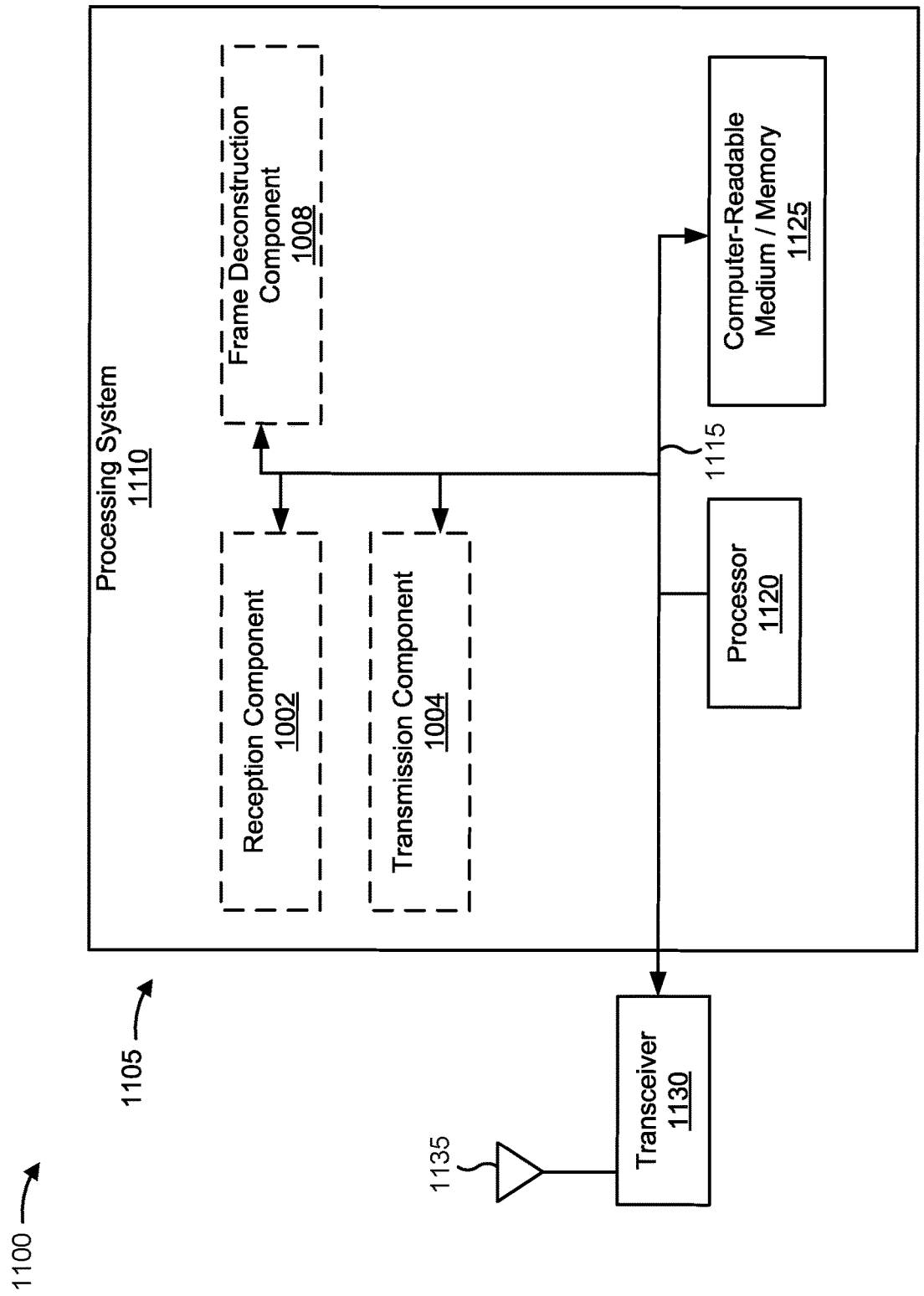
FIG. 11 is a diagram illustrating an example of a hardware implementation for an apparatus employing a processing system, in accordance with the present disclosure.

FIG. 11 is a diagram illustrating an example 1100 of a hardware implementation for an apparatus 1105 employing a processing system 1110, in accordance with the present disclosure. The apparatus 1105 may be a UE. In another example, the apparatus 1105 may be a network node and may include network node components, which correspond to the UE components described below.

The processing system 1110 may be implemented with a bus architecture, represented generally by the bus 1115. The bus 1115 may include any number of interconnecting buses and bridges depending on the specific application of the processing system 1110 and the overall design constraints.

The bus 1115 links together various circuits including one or more processors and/or hardware components, represented by the processor 1120, the illustrated components, and the computer-readable medium/memory 1125. The bus 1115 may also link various other circuits, such as timing sources, peripherals, voltage regulators, and/or power management circuits.

The processing system 1110 may be coupled to a transceiver 1130. The transceiver 1130 is coupled to one or more antennas 1135. The transceiver 1130 provides a means for communicating with various other apparatuses over a transmission medium. The transceiver 1130 receives a signal from the one or more antennas 1135, extracts information from the received signal, and provides the extracted information to the processing system 1110, specifically the reception component 1002. In addition, the transceiver 1130 receives information from the processing system 1110, specifically the transmission component 1004, and generates a signal to be applied to the one or more antennas 1135 based at least in part on the received information.

The processing system 1110 includes a processor 1120 coupled to a computer-readable medium/memory 1125. The processor 1120 is responsible for general processing, including the execution of software stored on the computer-readable medium/memory 1125. The software, when executed by the processor 1120, causes the processing system 1110 to perform the various functions described herein for any particular apparatus. The computer-readable medium/memory 1125 may also be used for storing data that is manipulated by the processor 1120 when executing software. The processing system further includes at least one of the illustrated components. The components may be software modules running in the processor 1120, resident/stored in the computer readable medium/memory 1125, one or more hardware modules coupled to the processor 1120, or some combination thereof.

In some aspects, the processing system 1110 may be a component of the UE 120 and may include the memory 282 and/or at least one of the TX MIMO processor 266, the RX processor 258, and/or the controller/processor 280. In some aspects, the apparatus 1105 for wireless communication includes means for transmitting, via an ultra-wide band connection, a first message conveying first data for a frame, the first data being associated with a first XR frame quality and a first quantity of parity bits; means for receiving a feedback message based at least in part on transmitting the first message; and means for transmitting, via the ultra-wide band connection and based at least in part on receiving the feedback message, a second message conveying second data for the frame, the second data being associated with a second XR frame quality and a second quantity of parity bits. The aforementioned means may be one or more of the aforementioned components of the apparatus 1000 and/or the processing system 1110 of the apparatus 1105 configured to perform the functions recited by the aforementioned means. As described elsewhere herein, the processing system 1110 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 11 is provided as an example. Other examples may differ from what is described in connection with FIG. 11.

The following provides an overview of some Aspects of the present disclosure:

Aspect 1: A method of wireless communication performed by an extended reality (XR) device, comprising: receiving, via an ultra-wide band connection, a first transmission conveying first data for a frame, the first data being associated with a first XR frame quality and a first quantity of parity bits; transmitting a feedback message based at least in part on receiving the first transmission; and receiving, via the ultra-wide band connection and based at least in part on transmitting the feedback message, a second transmission conveying second data for the frame, the second data being associated with a second XR frame quality and a second quantity of parity bits.

Aspect 2: The method of Aspect 1, wherein the first XR frame quality is different from the second XR frame quality.

Aspect 3: The method of any of Aspects 1-2, wherein the first quantity of parity bits is different from the second quantity of parity bits.

Aspect 4: The method of any of Aspects 1-3, wherein the second data includes more data than the first data, and wherein additional data of the second data relative to the first data is used for additional XR data associated with the second XR frame quality relative to the first XR frame quality or additional parity bits associated with the second quantity of parity bits relative to the first quantity of parity bits.

Aspect 5: The method of any of Aspects 1-4, wherein a quantity of re-transmissions for the frame is a fixed quantity applicable to each frame of a set of frames that includes the frame.

Aspect 6: The method of any of Aspects 1-5, wherein the feedback message is an acknowledgment message, and wherein the first data is associated with the first XR frame quality and the second data is associated with the second XR frame quality, the second data being based at least in part on a residual of the first data.

Aspect 7: The method of any of Aspects 1-5, wherein the feedback message is a negative acknowledgment message, and wherein the first data is associated with the first quantity of parity bits and the second data is associated with the second quantity of parity bits.

Aspect 8: The method of any of Aspects 1-7, wherein a channel bandwidth of the ultra-wide band connection includes a first sub-bandwidth for transmission of digital data relating to the frame and a second sub-bandwidth for transmission of analog data relating to the frame, the digital data and analog data relating to the frame including the first data and the second data.

Aspect 9: The method of any of Aspects 1-8, wherein the second transmission includes a first set of resources conveying the second data for the frame and a second set of resources conveying third data relating to another frame.

Aspect 10: The method of any of Aspects 1-9, wherein a data code rate of the second transmission is an aggregated code rate based at least in part on the first transmission and the second transmission.

Aspect 11: The method of any of Aspects 1-10, wherein a size of the second transmission is based at least in part on a gap to capacity associated with the first transmission.

Aspect 12: The method of any of Aspects 1-11, wherein a third transmission conveying third data for the frame is associated with a third XR frame quality and a combined data code rate of the first transmission and the second transmission.

Aspect 13: The method of any of Aspects 1-12, wherein one or more parameters associated with a configuration of the first transmission or the second transmission include a predetermined parameter or a signaled parameter, the configuration being associated with at least one of: a quantity of transmissions for the frame, a source redundancy version for the frame, a channel redundancy version for the frame, a quantity of frames for which data is conveyed in each transmission, or a gap to capacity feedback for the frame.

Aspect 14: The method of any of Aspects 1-13, further comprising: reconstructing the frame based at least in part on the first data and the second data.

Aspect 15: A method of wireless communication performed by a user equipment (UE), comprising: transmitting, via an ultra-wide band connection, a first message conveying first data for a frame, the first data being associated with a first XR frame quality and a first quantity of parity bits; receiving a feedback message based at least in part on transmitting the first message; and transmitting, via the ultra-wide band connection and based at least in part on receiving the feedback message, a second message conveying second data for the frame, the second data being associated with a second XR frame quality and a second quantity of parity bits.

Aspect 16: The method of Aspect 15, wherein the first XR frame quality is different from the second XR frame quality.

Aspect 17: The method of any of Aspects 15-16, wherein the first quantity of parity bits is different from the second quantity of parity bits.

Aspect 18: The method of any of Aspects 15-17, wherein the second data includes more data than the first data, and wherein additional data of the second data relative to the first data is used for additional XR data associated with the second XR frame quality relative to the first XR frame quality or additional parity bits associated with the second quantity of parity bits relative to the first quantity of parity bits.

Aspect 19: The method of any of Aspects 15-18, wherein a quantity of re-transmissions for the frame is a fixed quantity applicable to each frame of a set of frames that includes the frame.

Aspect 20: The method of any of Aspects 15-19, wherein the feedback message is an acknowledgment message, and wherein the first data is associated with the first XR frame quality and the second data is associated with the second XR frame quality, the second data being based at least in part on a residual of the first data.

Aspect 21: The method of any of Aspects 15-20, wherein the feedback message is a negative acknowledgment message, and wherein the first data is associated with the first quantity of parity bits and the second data is associated with the second quantity of parity bits.

Aspect 22: The method of any of Aspects 15-21, wherein a channel bandwidth of the ultra-wide band connection includes a first sub-bandwidth for message of digital data relating to the frame and a second sub-bandwidth for message of analog data relating to the frame, the digital data and analog data relating to the frame including the first data and the second data.

Aspect 23: The method of any of Aspects 15-22, wherein the second message includes a first set of resources conveying the second data for the frame and a second set of resources conveying third data relating to another frame.

Aspect 24: The method of any of Aspects 15-23, wherein a data code rate of the second message is an aggregated code rate based at least in part on the first message and the second message.

Aspect 25: The method of any of Aspects 15-24, wherein a size of the second message is based at least in part on a gap to capacity associated with the first message.

Aspect 26: The method of any of Aspects 15-25, wherein a third message conveying third data for the frame is associated with a third XR frame quality and a combined data code rate of the first message and the second message.

Aspect 27: The method of any of Aspects 15-26, wherein one or more parameters associated with a configuration of the first message or the second message include a predetermined parameter or a signaled parameter, the configuration being associated with at least one of: a quantity of messages for the frame, a source redundancy version for the frame, a channel redundancy version for the frame, a quantity of frames for which data is conveyed in each message, or a gap to capacity feedback for the frame.

Aspect 28: An apparatus for wireless communication at a device, comprising a processor; memory coupled with the processor; and instructions stored in the memory and executable by the processor to cause the apparatus to perform the method of one or more of Aspects 1-27.

Aspect 29: A device for wireless communication, comprising a memory and one or more processors coupled to the memory, the one or more processors configured to perform the method of one or more of Aspects 1-27.

Aspect 30: An apparatus for wireless communication, comprising at least one means for performing the method of one or more of Aspects 1-27.

Aspect 31: A non-transitory computer-readable medium storing code for wireless communication, the code comprising instructions executable by a processor to perform the method of one or more of Aspects 1-27.

Aspect 32: A non-transitory computer-readable medium storing a set of instructions for wireless communication, the set of instructions comprising one or more instructions that, when executed by one or more processors of a device, cause the device to perform the method of one or more of Aspects 1-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An extended reality (XR) device for wireless communication, comprising:
a memory; and
one or more processors, coupled to the memory, configured to:
receive, via an ultra-wide band connection, a first transmission conveying first data for a frame, the first data being associated with a first XR frame quality and a first quantity of parity bits;
transmit a feedback message based at least in part on receiving the first transmission; and
receive, via the ultra-wide band connection and based at least in part on transmitting the feedback message, a second transmission conveying second data for the frame, the second data being associated with a second XR frame quality and a second quantity of parity bits.

2. The XR device of claim 1, wherein the first XR frame quality is different from the second XR frame quality.

3. The XR device of claim 1, wherein the first quantity of parity bits is different from the second quantity of parity bits.

4. The XR device of claim 1, wherein the second data includes more data than the first data, and wherein additional data of the second data relative to the first data is used for additional XR data associated with the second XR frame quality relative to the first XR frame quality or additional parity bits associated with the second quantity of parity bits relative to the first quantity of parity bits.

5. The XR device of claim 1, wherein a quantity of re-transmissions for the frame is a fixed quantity applicable to each frame of a set of frames that includes the frame.

6. The XR device of claim 1, wherein the feedback message is an acknowledgment message, and wherein the first data is associated with the first XR frame quality and the second data is associated with the second XR frame quality, the second data being based at least in part on a residual of the first data.

7. The XR device of claim 1, wherein the feedback message is a negative acknowledgment message, and wherein the first data is associated with the first quantity of parity bits and the second data is associated with the second quantity of parity bits.

8. The XR device of claim 1, wherein a channel bandwidth of the ultra-wide band connection includes a first sub-bandwidth for transmission of digital data relating to the frame and a second sub-bandwidth for transmission of analog data relating to the frame, the digital data and analog data relating to the frame including the first data and the second data.

9. The XR device of claim 1, wherein the second transmission includes a first set of resources conveying the second data for the frame and a second set of resources conveying third data relating to another frame.

10. The XR device of claim 1, wherein a data code rate of the second transmission is an aggregated code rate based at least in part on the first transmission and the second transmission.

11. The XR device of claim 1, wherein a size of the second transmission is based at least in part on a gap to capacity associated with the first transmission.

12. The XR device of claim 1, wherein a third transmission conveying third data for the frame is associated with a third XR frame quality and a combined data code rate of the first transmission and the second transmission.

13. The XR device of claim 1, wherein one or more parameters associated with a configuration of the first transmission or the second transmission include a predetermined parameter or a signaled parameter, the configuration being associated with at least one of:
- a quantity of transmissions for the frame,
- a source redundancy version for the frame,
- a channel redundancy version for the frame,
- a quantity of frames for which data is conveyed in each transmission, or
- a gap to capacity feedback for the frame.

14. The XR device of claim 1, wherein the one or more processors are further configured to:
- reconstruct the frame based at least in part on the first data and the second data.

15. A user equipment (UE) for wireless communication, comprising:
- a memory; and
- one or more processors, coupled to the memory, configured to:
  - transmit, via an ultra-wide band connection, a first message conveying first data for a frame, the first data being associated with a first extended reality (XR) frame quality and a first quantity of parity bits;
  - receive a feedback message based at least in part on transmitting the first message; and
  - transmit, via the ultra-wide band connection and based at least in part on receiving the feedback message, a second message conveying second data for the frame, the second data being associated with a second XR frame quality and a second quantity of parity bits.

16. The UE of claim 15, wherein the first XR frame quality is different from the second XR frame quality.

17. The UE of claim 15, wherein the first quantity of parity bits is different from the second quantity of parity bits.

18. The UE of claim 15, wherein the second data includes more data than the first data, and wherein additional data of the second data relative to the first data is used for additional XR data associated with the second XR frame quality relative to the first XR frame quality or additional parity bits associated with the second quantity of parity bits relative to the first quantity of parity bits.

19. The UE of claim 15, wherein a quantity of re-transmissions for the frame is a fixed quantity applicable to each frame of a set of frames that includes the frame.

20. The UE of claim 15, wherein the feedback message is an acknowledgment message, and wherein the first data is associated with the first XR frame quality and the second data is associated with the second XR frame quality, the second data being based at least in part on a residual of the first data.

21. The UE of claim 15, wherein the feedback message is a negative acknowledgment message, and wherein the first data is associated with the first quantity of parity bits and the second data is associated with the second quantity of parity bits.

22. The UE of claim 15, wherein a channel bandwidth of the ultra-wide band connection includes a first sub-bandwidth for transmission of digital data relating to the frame and a second sub-bandwidth for transmission of analog data relating to the frame, the digital data and analog data relating to the frame including the first data and the second data.

23. The UE of claim 15, wherein the second message includes a first set of resources conveying the second data for the frame and a second set of resources conveying third data relating to another frame.

24. The UE of claim 15, wherein a data code rate of the second message is an aggregated code rate based at least in part on the first message and the second message.

25. The UE of claim 15, wherein a size of the second message is based at least in part on a gap to capacity associated with the first message.

26. The UE of claim 15, wherein a third transmission conveying third data for the frame is associated with a third XR frame quality and a combined data code rate of the first message and the second message.

27. The UE of claim 15, wherein one or more parameters associated with a configuration of the first message or the second message include a predetermined parameter or a signaled parameter, the configuration being associated with at least one of:
- a quantity of transmissions for the frame,
- a source redundancy version for the frame,
- a channel redundancy version for the frame,
- a quantity of frames for which data is conveyed in each transmission, or
- a gap to capacity feedback for the frame.

28. A method of wireless communication performed by an extended reality (XR) device, comprising:
- receiving, via an ultra-wide band connection, a first transmission conveying first data for a frame, the first data being associated with a first XR frame quality and a first quantity of parity bits;

transmitting a feedback message based at least in part on receiving the first transmission; and receiving, via the ultra-wide band connection and based at least in part on transmitting the feedback message, a second transmission conveying second data for the frame, the second data being associated with a second XR frame quality and a second quantity of parity bits.

29. The method of claim 28, wherein the first XR frame quality is different from the second XR frame quality.

30. A method of wireless communication performed by a user equipment (UE), comprising:

transmitting, via an ultra-wide band connection, a first message conveying first data for a frame, the first data being associated with a first extended reality (XR) frame quality and a first quantity of parity bits;

receiving a feedback message based at least in part on transmitting the first message; and transmitting, via the ultra-wide band connection and based at least in part on receiving the feedback message, a second message conveying second data for the frame, the second data being associated with a second XR frame quality and a second quantity of parity bits.

* * * * *